United States Patent [19]

Tucker et al.

[11] Patent Number: 4,807,287
[45] Date of Patent: Feb. 21, 1989

[54] DOCUMENT AUTHENTICATION METHOD

[75] Inventors: Frank D. Tucker, Valencia; Leonard Nunley, Agoura, both of Calif.

[73] Assignee: Light Signatures, Inc., Los Angeles, Calif.

[21] Appl. No.: 34,192

[22] Filed: Apr. 6, 1987

[51] Int. Cl.$^4$ ..................... H04K 1/00; G06F 11/10
[52] U.S. Cl. .................................... 380/23; 380/24; 380/51; 340/825.34; 371/37; 371/40
[58] Field of Search .................................. 380/23–25, 380/51; 340/825.34; 382/12, 13; 371/37, 40; 360/32

[56] References Cited

U.S. PATENT DOCUMENTS

| | | | |
|---|---|---|---|
| 4,053,737 | 10/1987 | Lafevers et al. | 382/12 |
| 4,206,315 | 6/1980 | Matyas et al. | 380/23 |
| 4,281,215 | 7/1981 | Atalla | 380/23 |
| 4,304,961 | 12/1981 | Campbell, Jr. | 380/23 |
| 4,349,695 | 9/1982 | Morgan et al. | 380/23 |
| 4,376,299 | 3/1983 | Rivest | 380/23 |
| 4,393,269 | 7/1983 | Konheim et al. | 380/24 |
| 4,417,338 | 11/1983 | Davida | 380/21 |
| 4,423,415 | 12/1983 | Goldman | 340/825.34 |
| 4,549,075 | 10/1985 | Saada et al. | 380/23 |
| 4,637,051 | 11/1987 | Clark | 380/51 |
| 4,641,346 | 2/1987 | Clark et al. | 380/51 |
| 4,654,480 | 5/1987 | Weiss | 380/48 |
| 4,661,658 | 4/1987 | Matyas | 380/23 |
| 4,675,754 | 6/1987 | Endo et al. | 360/32 |
| 4,703,511 | 10/1987 | Conoval | 382/13 |
| 4,726,028 | 2/1988 | Himeno | 371/37 |
| 4,748,628 | 5/1988 | Moriwaki | 371/40 |

Primary Examiner—Salvatore Cangialosi
Attorney, Agent, or Firm—Nilsson, Robbins, Dalgarn, Berliner, Carson & Wurst

[57] ABSTRACT

A system for authenticating a document includes a uniqueness characteristic reader to generate a first identifier for the document. The identifier is then encrypted and optionally encoded to define an error correction code. The encrypted identifier and the optional error correction code are combined in accordance with a predefined format to define a code which is stored on the document itself (such as on a magnetic stripe). Authentication of the document is accomplished by reading the code on the item. The code is then processed to identify the location and quantity of any erroneous data. The identified location and quantity information for erroneous data, in conjunction with the optional error correction code, is then utilized to correct all errors in at least the encrypted identifier portion of the code read from the storage medium. The resultant encrypted identifier is therefore retrieved from the storage medium on the item without error. The retrieved encrypted identifier is then decrypted to retrieve the first identifier. A second item identifier is generated by reading the uniqueness characteristic from the document in the same manner that the first item identifier was generated. The second item identifier is then compared with the retrieved identifier from the document with the document being authenticated when the retrieved identifer compares with the second item identifier according to a predefined compare criteria.

19 Claims, 10 Drawing Sheets

FIG. 1
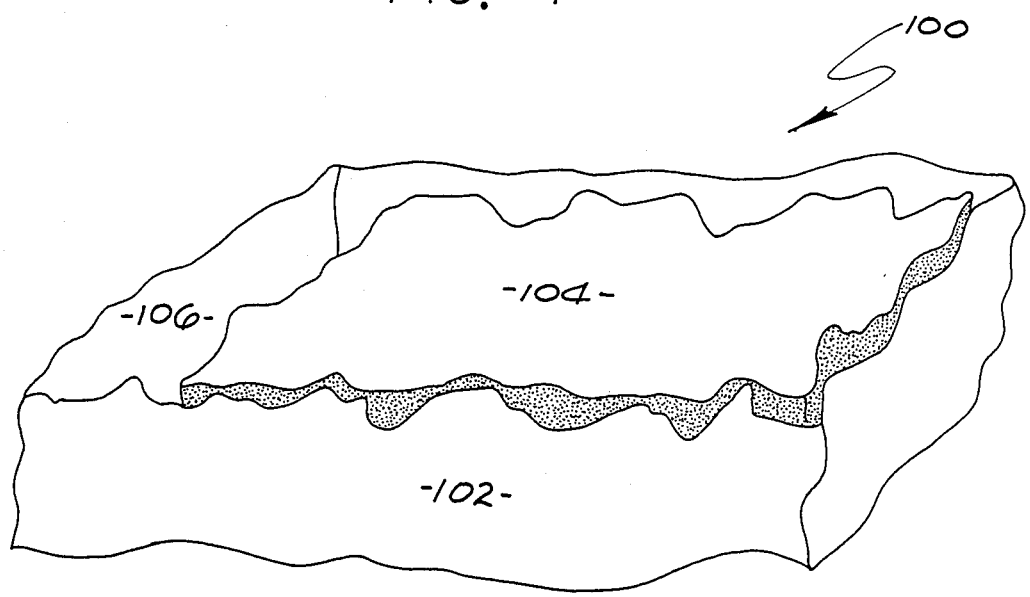
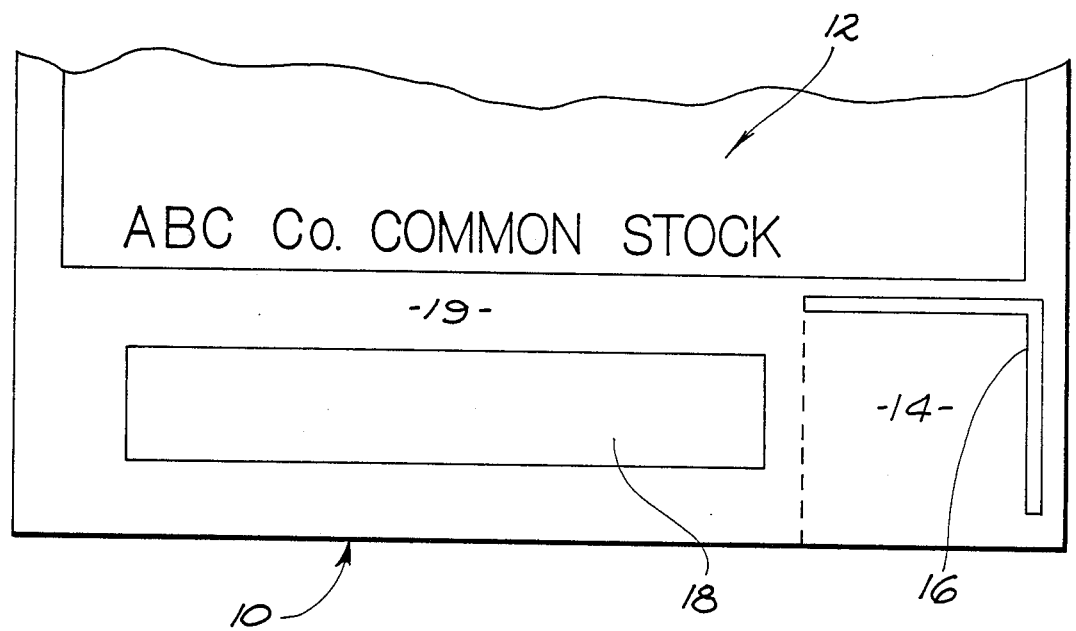
FIG. 2

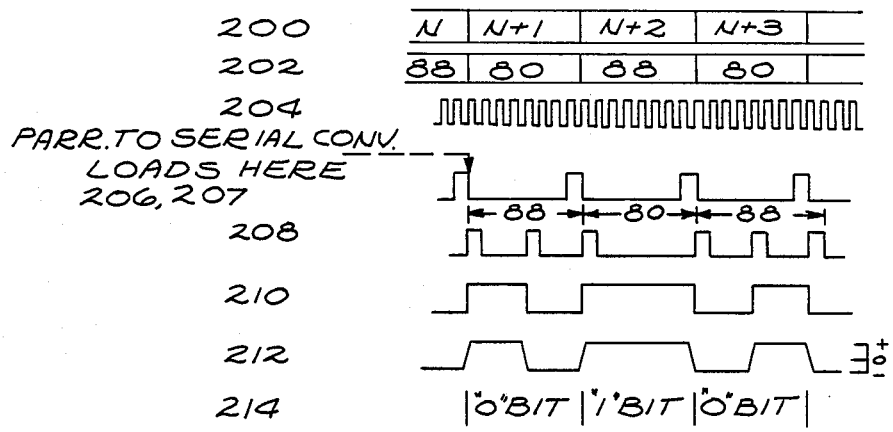
FIG. 6A
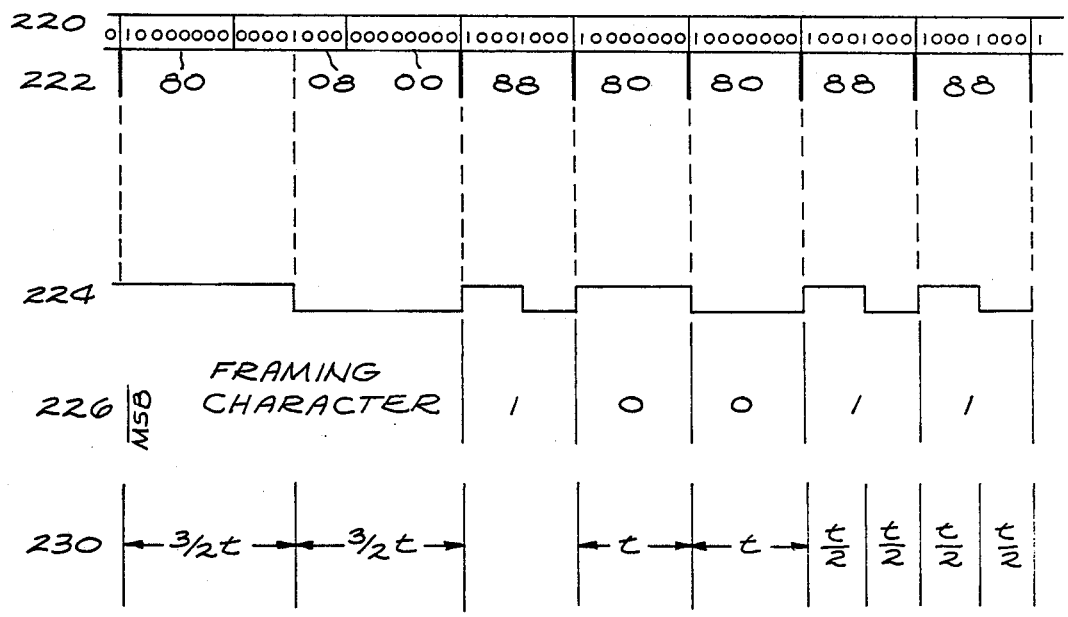
FIG. 6B
FIG. 6C
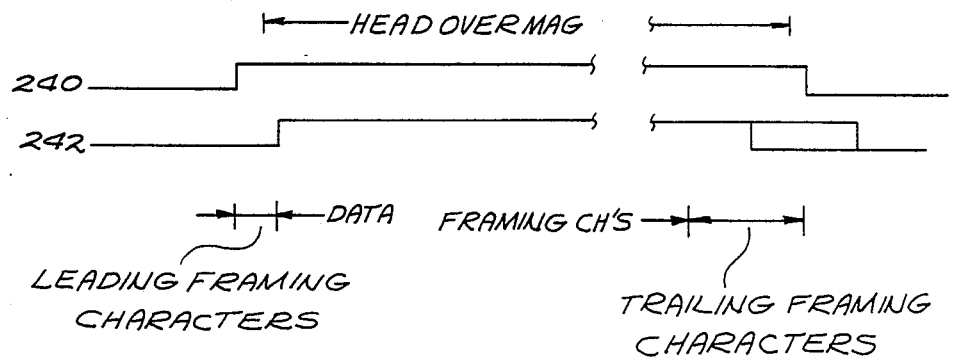

DOCUMENT AUTHENTICATION METHOD

BACKGROUND OF THE INVENTION

The present invention relates to a system for self authenticating an item of value, and in particular, to a system for authenticating items by retrieving authenticating data from a storage medium such as a magnetic stripe disposed on the item of value, even if the storage medium has been physically damaged.

Numerous systems have been devised for authenticating articles, particularly those vulnerable to being counterfeited. Examples include imprinting an object with a difficult to copy pattern, application of holographic tape and marking the item with secret identification indicia.

One particularly effective method and apparatus for authenticating articles is described in U.S. Pat. No. 4,423,415, issued Dec. 27, 1983, to Goldman and entitled "Non-Counterfeitable Document System." Although, the Goldman system is effective, additional security may be desired if the item to be authenticated is a high value document such as a stock certificate or bond. One means of increasing security is to encrypt the identifier in a manner such as described in U.S. Pat. No. 4,405,829 entitled "Cryptographic Communications System and Method" issued Sept. 20, 1983, to Rivest et al.

Of specific interest is the method of encrypting using a private key known only to the source, i.e., the entity issuing the stock or bond, but decrypting using a public key known to the public and indeed which may even be identified on the document itself. Successful decryption using the public key will only be possible if the encryption was initially done using the private encryption key. Therefore, successful decryption will indicate the document indeed originated with the stock or bond issuer and is genuine.

Unfortunately, this and other useful encryption techniques result in very large encrypted identifiers which would have to be printed on the document. However, printing such numbers on the document so as to be manually readable is impractical because of the inherent space limitations on the document as well as the difficulty in manually reading such a long number. Therefore, alternative means of storing the anticipated large string of numbers defining the encrypted data on the document are desired.

One means of storing very large quantities of information in a small space is to place a machine readable magnetic stripe on the item itself. However, practical use of a magnetic stripe to store data on a document presently requires that the stripe be printed directly onto the document. Because documents are generally made out of paper and paper has a highly irregular surface contour, a printed magnetic stripe will exhibit a highly irregular geometry which cause wide variations in the magnetic flux characteristic along the length of the stripe. Heretofore, such wide variations in magnetic flux characteristics have resulted in the inability to retrieve data accurately or reliably - an essential requirement when encrypted data is stored to verify authenticity.

Mangetic stripes as well as other storage medium disposed directly onto paper documents such as stock certificates, would in any event be subject to physical damage such as tearing, folding or scratching thereby adding to the difficulty of reliably retrieving data from the document's storage medium. Further exacerbating the problem is the fact that encrypted data must be stored and retrieved without errors. Indeed, any error in reading encrypted data will cause the result of decryption to be "garbage". Therefore, authentication of documents by storing authenticating data on a storage medium disposed directly on the document, particularly where the document must be authenticatable in the presence of possible physical damage, has not heretofore been possible even though use of a storage medium, such as a magnetic stripe, imprinted directly on the document is desired.

Efforts to overcome non-uniform magnetic flux problems so as to enable use of a printed magnetic stripe have included making the magnetic stripe more uniform by improving the method of applying the magnetic composition and by improving the ink formulations. Such efforts have been unsuccessful and, in any event, have not addressed the problem of reliably reading the magnetic stripe in the presence of physical damage.

Another suggested approach has been to attach a strip of magnetic tape over the surface of the document since magnetic tape exhibits uniform magnetic characteristics and can be made strong enough to resist most physical damage. However, overlaying tape on the document is incompatible with current document printing specifications. In any event, application of magnetic tape would make a genuine document vulnerable to damage by removal of the tape.

Therefore, there is a need for an authentication system which includes a document with a storage medium such as a magnetic stripe printed directly on its surface and capable of storing large quantities of data, at least a portion of which data is preferably encrypted, and from which the stored data can be retrieved without errors, even in the presence of physical damage such as tears, folds or scratches, thereby enabling decryption and authenticity verification. The storage medium (stripe) is preferably of the type that is applied by offset printing so as to be highly compatible with the printing of the remaining information on the document of value.

SUMMARY OF THE INVENTION

In accordance with the present invention, a document, such as a stock certificate or bond having a significant value, may be authenticated as being genuine by first providing a storage medium, preferably machine readable, such as by printing a magnetic composition (e.g. ink) onto a part of the irregular surface of the item so as to form a storage area on the document. The document (item-of-value) will generally be made of a fibrous medium, such a paper, which exhibits a highly irregular surface contour characteristic. In the case of a magnetic stripe, a magnetic composition, used to form the magnetic stripe, will flow over and follow the irregular surface giving the resultant magnetic storage stripe a highly irregular geometry, surface contour and magnetic particle concentration characteristic resulting in a non-uniform, difficult to read, magnetic flux characteristic along the stripe.

In the case of a magnetic stripe, the magnetic stripe is next encoded with a suitable identifier such as a number. With other mediums, e.g., bar type codes or imprinted readable patterns, the encoding of the identifier occurs as part of the process of applying the storage medium to the document.

The identifier may be selected and associated with the document to be later authenticated by any suitable means. However, a preferred means of selecting an identifier is to select a document with a medium which has a uniqueness characteristic. The uniqueness characteristic is sensed and used to derive an identifier such as in the manner described in U.S. Pat. No. 4,423,415. The identifier value is next encrypted, preferably in accordance with the encryption algorithm described in U.S. Pat. No. 4,405,829 issued Sept. 20, 1986, to Rivest et al. which patent is hereby incorporated by reference. The encrypted identifier is then processed to define an error correction code. A preferred error correction code may be derived in accordance with the teaching of *Error-Correcting Codes*, by Peterson and Weldon, MIT Press at page 269 et seq.

The error correction code and the encrypted identifier, each in the form of a string of digital data bits, are combined in accordance with a predefined format to form a bit string. According to a preferred predefined format, the bit string starts with "1's" and ends with an indefinite number of repetitions of a predefined bit sequence referred to herein as a "framing character." Following the repetition of "1's" on one end of the bit string is a predefined recognizable bit sequence defined as a "start sentinel" followed by a data field which starts with a framing character and is followed, in any predefined order, by the encrypted identifier, the error correction code, a public decryption key, any other desired data (optional) and ending with another framing character. Following the data field is another predefined recognizable bit sequence defined as a "stop sentinel" followed by the ending repetition of framing characters. Additional framing characters are interspersed at defined bit intervals in the data field. The framing characters are recognizable and enable the location and quantity of erroneous, missing, or lost data to be identified and in some instances enable the value of the missing, erroneous or lost data to be recovered. When a magnetic stripe is used, the resultant formatted bit string is written onto the non-uniform magnetic stripe by altering the magnetic flux along the length of the magnetic stripe in accordance with a selected data storage convention used for magnetic stripes such as the F2F convention.

The document is authenticated by first obtaining a verification value which is to be compared against the stored identifier. A match will indicate the document is authentic. In the preferred system, the uniqueness characteristic along a predefined, specified area of the document is sensed and a verification value derived from the sensed data. Reading apparatus next reads the data on the storage medium such as by sensing the flux variations representative of the bit string previously stored along the non-uniform magnetic stripe. However, because of the non-uniform magnetic characteristic of the magnetic stripe and because of scratches, folds, tears and other defects or damage to the document, the previously stored bit string will include errors and missing data. Therefore, the present invention includes novel methods of processing the signal representative of the data read from the storage medium to read those bits in the bit string which can be read despite the non-uniformities, irregularities and damage, and recover and replace data which was erroneously read, lost or otherwise made unreadable due to folds, tears or other damage to the document itself. Such methods includes local signal processing and local and global error correction techniques to correct erroneous or missing data; to identify the locations and quantity of other missing or erroneous data using, inter alia, the framing characters; and, using the information as to the location and quantity of missing or erroneous data in conjunction with the error correction code, to recover the value of the remaining missing or erroneous data. The present invention has been found to enable recovery of the originally stored bit string from the storage medium, and in particular, non-uniform magnetic stripes, without error in almost all cases, even when the document has significant physical damage.

The resulting recovered portion of the bit string which is the encrypted identifier, is then decrypted and compared with the obtained verification value according to a predefined compare criterion. The item is authenticated when the vertification value and the decrypted identifier value compare according to the predefined compare criterion. The verification value and the decrypted identifier do not need to match exactly for the document's authenticity to be assured. The number of errors which can be accepted and still result in a positive authentication indication are predefined and are part of the predefined compare criterion.

BRIEF DESCRIPTION OF THE DRAWINGS

In the drawings, which constitute a part of the specification, exemplary embodiments are set forth as follows:

FIG. 1 is a partial cutaway perspective of a document with a storage medium thereon and specifically a magnetic stripe storage medium;

FIG. 2 is a top partial view of a document showing an area characterized by a uniqueness characteristic and a magnetic stripe storage medium;

FIGS. 6A, 6B and 6C illustrate various waveforms, timing relationships and binary bit string data illustrating the operation of the authentication system in accordance with the invention;

DETAILED DESCRIPTION

Figure 3:
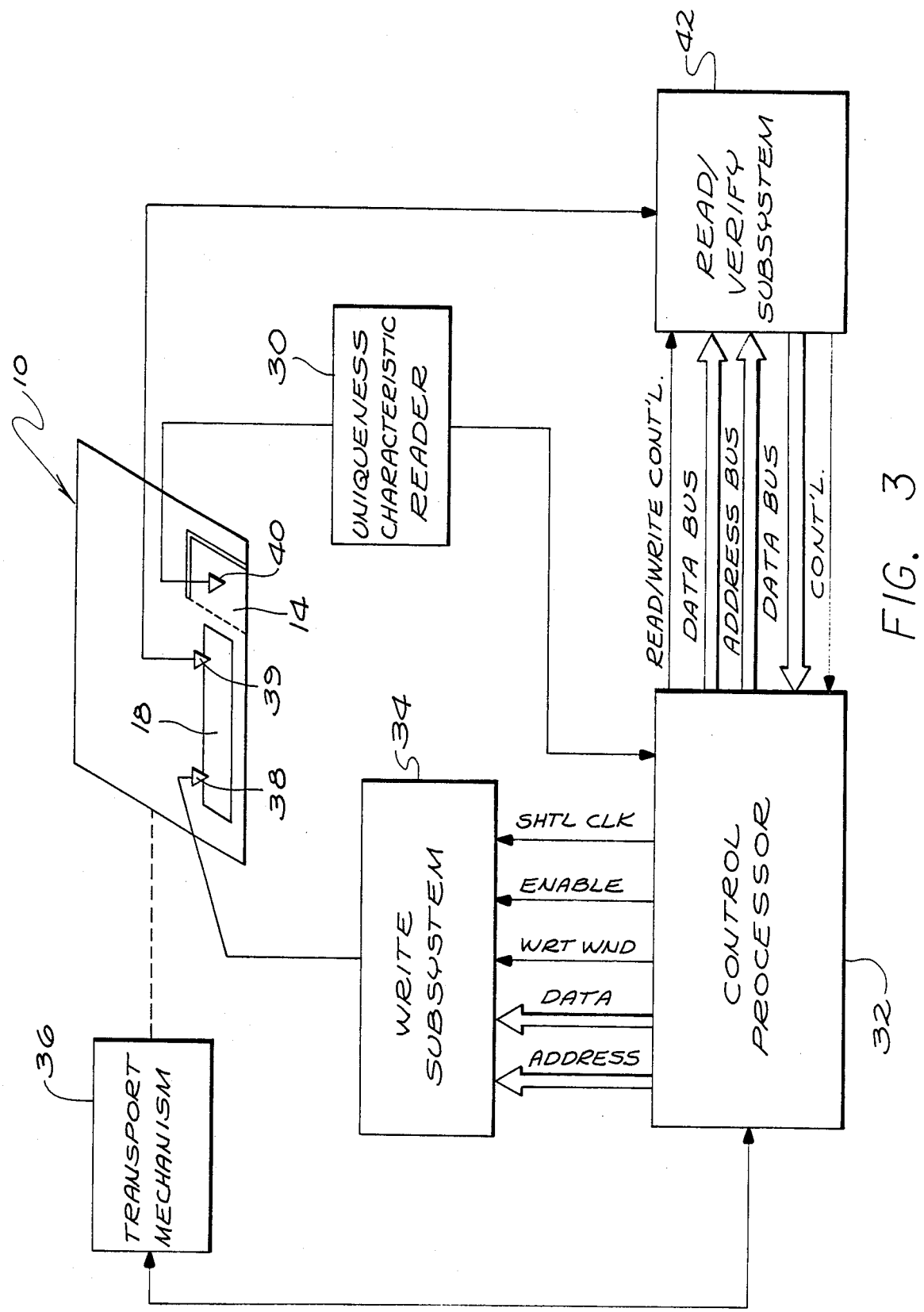
FIG. 3 is a simplified block diagram illustrating a system, including an optional write subsystem, in accordance with the invention.

Although the present invention contemplates the use of various storage mediums on a document, the following detailed description is given with reference to a magnetic stripe as the preferred storage medium.

Referring initially to FIG. 1, an item 100, such as a document made out of a fibrous medium 102 such as paper, as a surface 106 on which a magnetic stripe 104 is disposed such as by offset printing. The paper medium from which most documents of value such as stocks or bonds are made result in a highly irregular surface geometry. When a composition such as a magnetic ink is applied to such a surface to form a magnetic stripe, the resultant stripe assumes a similar irregular geometry. The magnetic stripe 104 consequently has a highly irregular geometry exhibiting a non-uniform magnetic flux characteristic along its length. Such a stripe is nevertheless the preferred authenticity verification storage medium for such documents of value.

Referring to FIG. 2, the system in accordance with the invention comprises a printable item 10 made of paper or any other printable medium such as that described in conjunction with FIG. 1. Matter readable by an observer such as words, designs, pictorial representations and the like 12 may be printed across the surface of the document 10 using any desired method such as offset printing. For example, the printing may be such as to identify the document as a stock or bond which may be of considerable monetary worth and indeed may be a negotiable instrument. In order to provide additional protection against counterfeiting, a space 14 on the surface of the document 10 is set aside to define a field of sensible locations. A corner indicia 16 is positioned about the edge of the space 14 to define the space and enable alignment of a uniqueness characteristic reader 30 (FIG. 3) with the space for subsequent repetitive reading such as in the manner set forth in U.S. Pat. No. 4,423,415. The space 14 defines a specified area of the item which has, for example, a random but substantially non-changing transparency variation over its surface. That random transparency defines a uniqueness characteristic which is machine readable in accordance with U.S. Pat. No. 4,423,415. Once sensed, an identifier representative of that uniqueness characteristic is derived and assigned. Of course, any other uniqueness characteristic of the document which can be sensed and referenced by an identifier value, can be utilized without departing from the present invention.

The document 10 further includes a storage medium, which in the illustrated embodiment is a magnetic stripe 18 disposed over a portion of the irregular, random surface 19 of the document 10 by printing and preferably by offset printing. The magnetic stripe 18 will generally have non-uniform geometric and magnetic flux characteristics such as those described in conjunction with FIG. 1.

Referring to FIG. 3, a simplified block diagram of an authentication system in accordance with the invention includes the document 10 of FIG. 2 having the magnetic stripe 18 to provide an escort memory on the document 10. The uniqueness characteristic (such as transparency) is sensed from region 14 by a uniqueness characteristic sensor 40. The uniqueness characteristic reader 30 is coupled to the sensor 40 to receive a signal representative of the sensed uniqueness characteristic and therefrom define the identifier such as a binary number. Apparatus and methods for reading and deriving an identifier representaitve of the uniqueness characteristic are fully described in U.S. Pat. No. 4,423,415, which patent is hereby incorporated by reference. A control processor 32 receives the identifier from the reader 30 and preferably encrypts the identifier and then processes the encrypted identifier to generate an error correction code for the encrypted identifier. In the preferred embodiment, the error correction code is a Bose-Chaudhure-Hocquenghem code whose derivation is fully described at page 269 et seq. in *Error Correcting Codes* by Peterson and Weldon published by MIT Press. The encrypted identifier and the error correction code, both digitized, are combined with any other desired data, such as a public encryption key, to form a coded identifier.

Before being stored on the storage stripe, the coded identifier is formatted in accordance with a predefined format selected to facilitate authentication and data recovery. The result is a bit string which is sent to a write subsystem 34. The write subsystem 34 generates a "write current" signal 212 (FIG. 6A) representative of the bit string 214 (FIG. 6A). the write current signal 212 is provided to a write head 38 which, when positioned in close proximity to the magnetic stripe 18, will cause flux changes along the length of the stripe 18 as the stripe 18 moves past. In order to write the bits of the bit string 214 onto the stripe 18 at the correct location, a transport mechanism 36, under control of the control processor 32, causes the document 10 to physically pass beneath the write head 38 so that the write subsystem 34 will cause flux changes representative of individual bits in sequence to occur at predefined spacings along the magnetic stripe 18. A transport mechanism, useful in such a configuration, is described in the aforementioned U.S. Pat. No. 4,423,415. Of course, the invention is equally applicable if the document 10 remains stationary and the write head 38 moves across the document.

To verify the authenticity of the document 10, the information stored on the magnetic stripe 18 is read as the document is moved by the transport mechanism 36 past a second head 39 under control of the control processor 32. The resultant signal (ideally appearing as the signal 228 of FIG. 8 but in reality having the characteristics of signal 300 of FIG. 8) is provided to a read-/verify subsystem 42 which performs signal processing and correlation processing to recover a bit string which ideally would be the same as the bit string originally stored but in reality has both errors in the bit values and missing bits. The resultant read bit string signal 302 (FIG. 8), in the form of time durations between peaks and peak polarity information, is then sent to the control processor 32 which applies local and global error correction algorithms in accordance with the invention to correct the remaining errors and thereby retrieve at least the encrypted identifier part of the bit string without error. The encrypted identifier is next decrypted in the control processor 32 to retrieve the identifier. The retrieved identifier is compared with a verification value from the reader 30 in the processor 32. If the retrieved identifier and the verification value match according to a predefined match criterion such as bit by bit identity, the document is verified as genuine.

The specific method of writing onto the magnetic stripe, reading data from the magnetic stripe and then processing the information to recapture missing or unreadable information will be described in greater detail hereafter.

Figure 4:
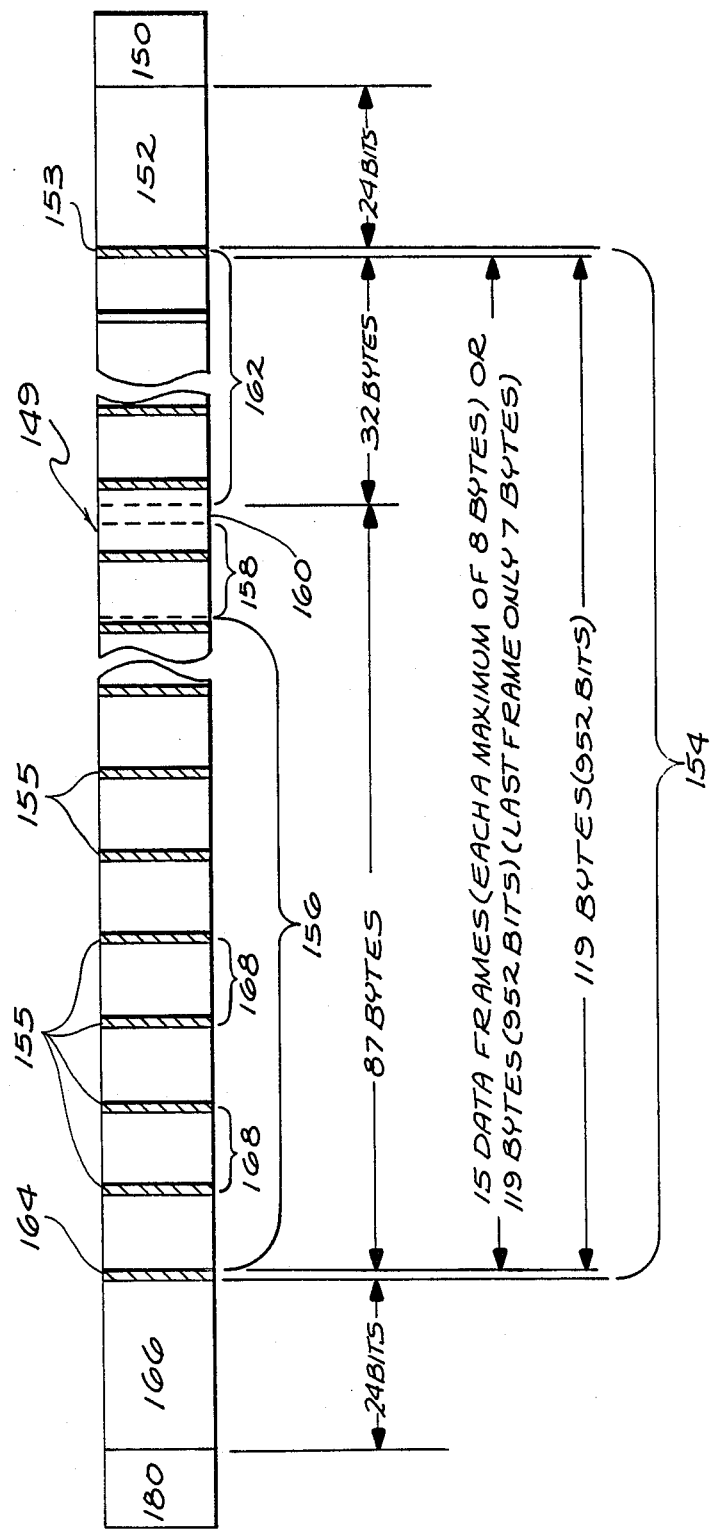
FIG. 4 is a pictorial representation of a bit string formatted for storage on a storage medium, such as a magnetic stripe, on a document.

Referring to FIG. 4, the preferred format of the bit string 149 to be stored on the magnetic stripe 18 includes a leading edge 150 to allow automatic gain control (AGC) in a conventional manner, and a trailing edge 180 with a similar AGC to allow reading in either direction. The leading edge is a string of "1's" and trailing edge 180 preferably consists of a string of non-data characters referred to as framing characters. The number of "1's" in the leading edge and number of framing characters in the trailing edge is unimportant and may be any number sufficient to provide AGC. Following the leading edge 150 is a predefined sequence of bits, for example those represented by the 24 bit hexidecimal number FC0167, defined as a start sentinel 152. Following the start sentinel 152 is a data field 154 comprising a first framing character 153, an error correction code 162, a format designation coding 160, a public encryption key designation 158, the encrypted identifier 156, and a final framing character 164. Following the framing character 164 is a stop sentinel 166 which is a predefined and recognizable sequence of bits, for example, those represented by the 24 bit hexidecimal number 09D7FF.

In accordance with the invention, the data field 154 is divided by framing characters 155 into equal subsections comprised of a predefined number of data bits, (e.g., 64 bits of data). Because (1) the number of data bits between framing characters is predefined, and (2) the bit time, that is, the time between flux changes representative of a "zero" and a "one" are known or can be determined, and (3) certain polarity conditions must exist in the sensed signal (for example, the magnetic flux change can only change from a positive to a negative or a negative to a positive, never a positive to a positive or a negative to a negative), correction of numerous local errors in individual bits can be performed. Even when the value of certain bits cannot be determined by such local error correction, the bit time, time between framing characters and polarity information enables the location of errors (their addresses in the bit string) and the number of missing or erroneous bits to be determined. This information is used in conjunction with the error correction codes to correct erroneous data or recover missing data in the bit string.

In a preferred embodiment of the invention, encryption of the identifier occurs using a private key while decryption is done using a public key. In accordance with the teaching of U.S. Pat. No. 4,405,829, successful decryption according to the public key evidences the authenticity of the document by establishing that the document originated from a particular source since decryption using the public key designation would only be possible if encryption had occurred in accordance with a private key known only to the legitimate originator of the document.

Referring again to FIG. 4, an illustrative data field format consists of 87 bytes which includes the encrypted identifier 156, the public key designation 158 and format designation 160, and 32 bytes of error correction code 162. The total of 119 bytes (952 bits) in the data field 154 are divided into data frames 168 consisting of 8 bytes (64 bits) of data. The start and stop sentinels 152 and 166, neither of which can have any nested framing characters, are each 24 bits in length. In accordance with error correcting theory, as set forth in the above book entitled *Error Correcting Codes,* up to 16 bytes of missing data can be recovered in the bit string 149 provided the quantity of missing data can be determined. As previously described, the non-data framing characters, bit times and polarities are used to define the location and quantity of missing or erroneous data in a manner to be described hereafter.

Figure 8:
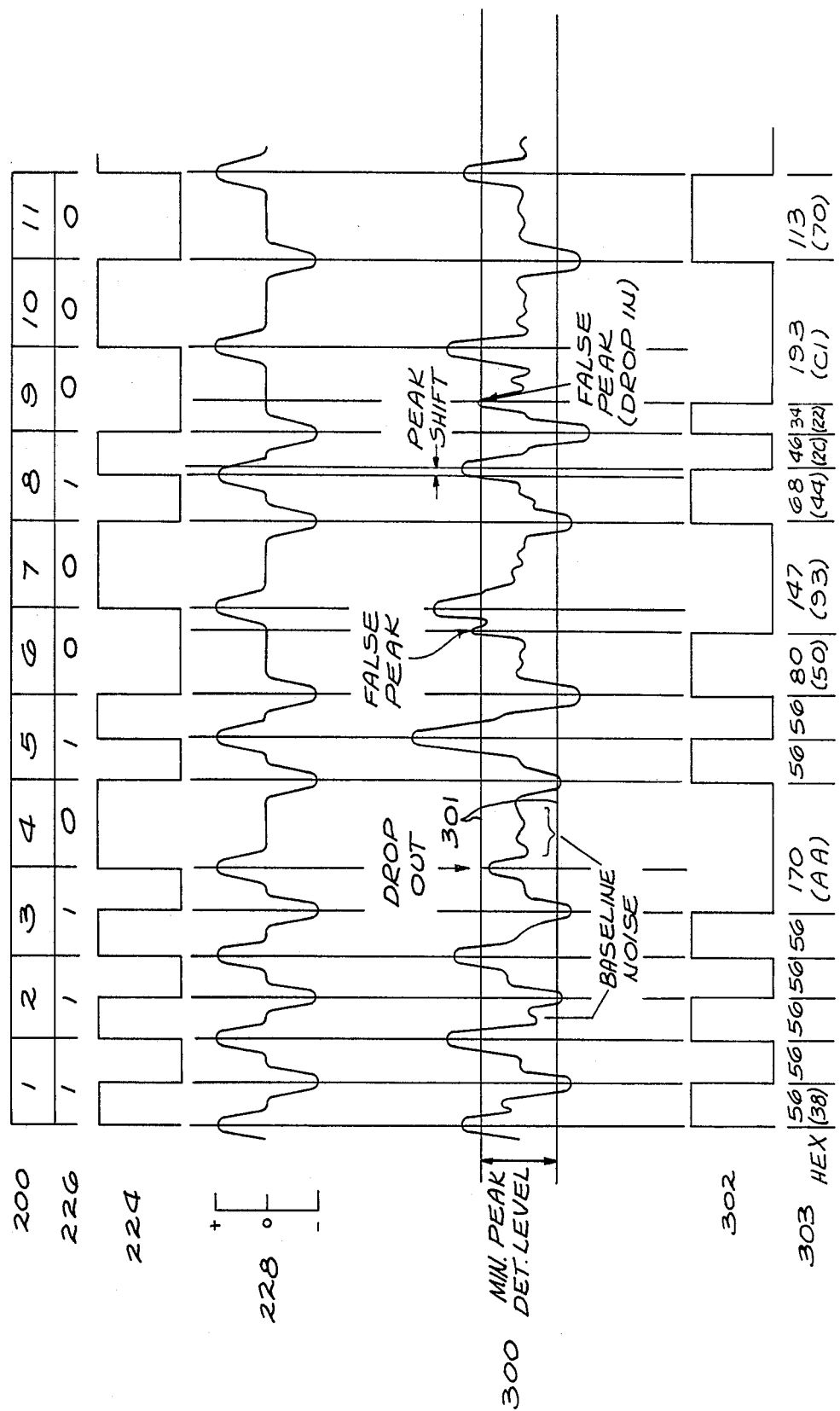
FIG. 8 is an illustration of various address, bit data, write and read signals at various locations in the authetication system of FIGS. 3, 5 and 7.

With further reference to the format of the bit string, the data in the bit string 149 can be generated and stored in a register as a series of "1"s and "0"s in a conventional manner. The register in the above illustration of FIG. 4 would be 952 bits (storage locations) or 119 bytes long. Using the F2F convention for storing the data in such a register on a magnetic stripe, a single flux change within a predefined spacing along the magnetic stripe represents a "0" whereas two equally spaced flux changes within the same defined spacing would represent a "1". Stated differently, the value of each data bit may be represented by time periods between flux changes as the magnetic head 38 or 39 moves along the magnetic stripe 18 at a predefined speed. A "0" would be represented by a single time period (designated in Chart 230 of FIG. 6B as "t") whose value is determined by the bit density of the medium, the data sample rate, and the relative speed between the magnetic head (38 or 39) writing data onto or reading data from the stripe 18. A "1" would be represented by two consecutive time periods, each equal to ½ the duration of the time period of a "0" or ½ t (see time charts 303, FIG. 8 and 230, FIG. 6B). In the example of FIG. 8, t is taken as 112 microseconds.

However, simply storing one data bit in one register location makes it impossible for the processor 32 to define framing characters digitally since framing characters are represented by flux changes at intermediate times between when a flux change, representative of a data bit, would occur. Referring to bit sequence 226 in FIG. 6B and 214 in FIG. 6A, the impossibility of distinguishing a non-data framing character from a real data character when each bit of data is represented by only one storage location can be seen. To overcome this difficulty in accordance with the present invention, the processor 32 generates a binary bit string wherein each data bit is represented by eight "sub" bits (herein "binary bits") where a "0" is the sequence of binary bits 1000 0000 or 80 HEX and a "1" is the sequence of binary bits 1000 1000 or 88 HEX (see binary bit string 220 and its HEX representation 222 in FIG. 6B). A framing character can then be defined by the 24 binary bit sequence (corresponding to three "0" data bit times) 1000 0000 0000 1000 0000 0000 or 80 08 00 HEX, so that flux changes generated at intermediate times can represent non-data information.

Since representation of flux changes as either data or non-data framing characters depends on the time spacing between flux changes, it can be seen from the time chart 230 of FIG. 6B that the above binary bit representation results in the time period "t" between flux changes for a zero, two consecutive time periods t/2 for a one, and two consecutive time periods 3t/2 for a framing character. The octal representation 222 of the sequence of binary bits 220 representative of the bit string fragment 226 is therefore 80 08 00 88 80 80 88 88. As can now be appreciated, a "1" in the binary bit string 220 generated by the processor 32 (FIG. 3) indicates not only that a flux change is to occur but also indicates when the flux change is to occur. Therefore, by writing the binary bit sequence 220 serially and at a predefined but constant rate, the time between each binary bit in the string 220, will be the same and the time duration between flux changes will indicate the value of the data stored or whether the information is a framing character. Of course, other storage conventions may be adopted without departing from the spirit of the invention in its broader aspects.

The use of eight binary bits also permits a degree of error tolerance in reading. For example, if instead of reading 80 HEX, the data read was 40 HEX, the processor could be programmed to still assign a "0" to that bit since 40 HEX should never occur and really indicates that the bit read was only displaced one binary bit position along the binary bit string.

Although the above bit and binary bit string formats have been illustrated with reference to certain specific characteristics, wide variations in the formatting of such bit strings are possible without departing from the spirit of the invention in its broadest aspects.

In order to store bit string 226 formatted in the manner described in conjunction with FIGS. 4 and 6B as flux changes at selected intervals along the magnetic stripe 18, the corresponding binary bit string 220 in FIG. 6B, is provided from the control processor 32 to the write subsystem 34 (see FIG. 3) which then causes magnetic flux variations to be applied along the length of the magnetic stripe where they are preserved for subsequent reading.

Figure 5:
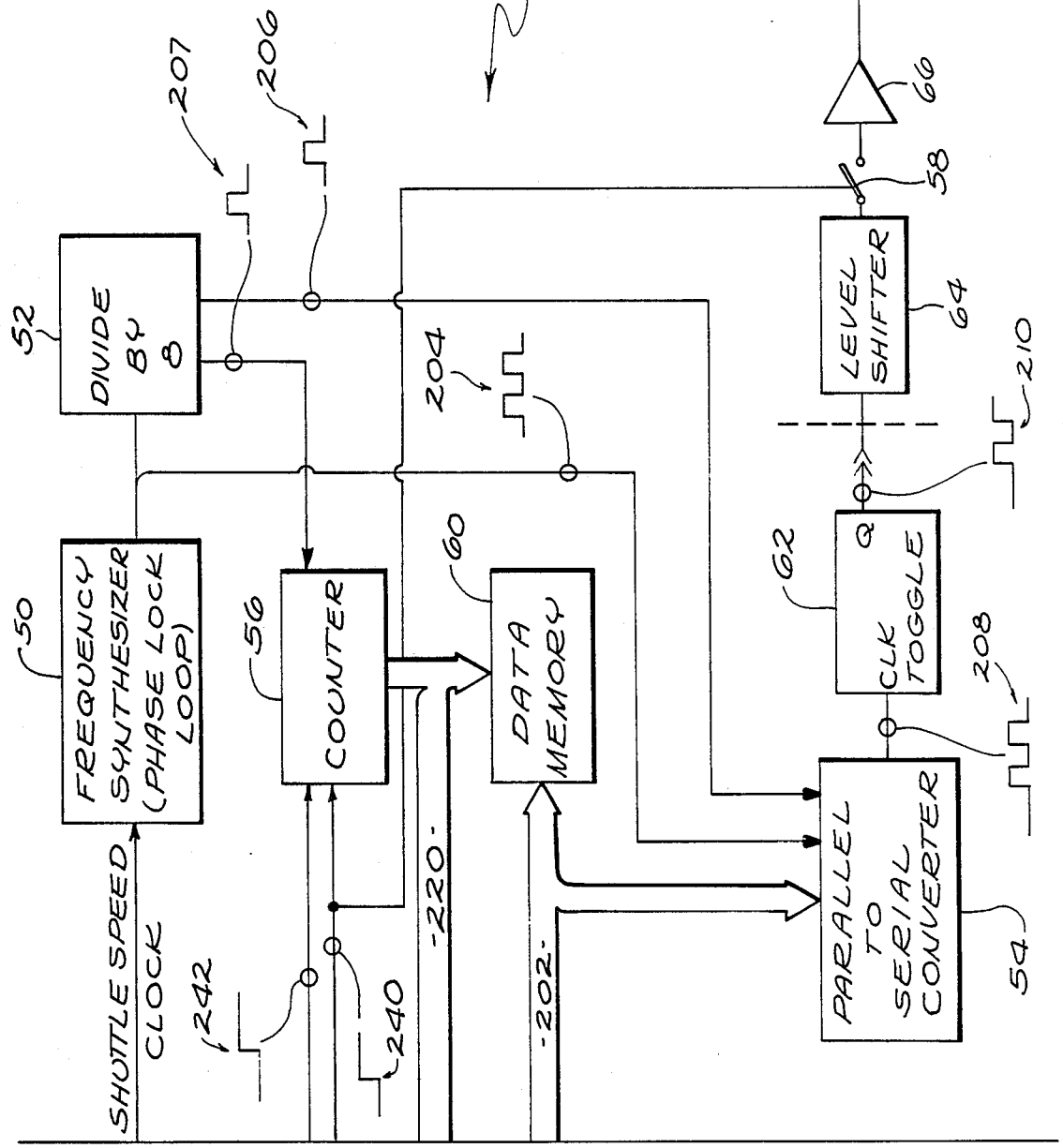
FIG. 5 is a simplified block diagram showing a write subsystem such as that depicted in FIG. 3.

Referring to FIG. 5 in conjunction with FIGS. 3, 6A, 6B and 6C the write subsystem 34 includes a frequency synthesizer 50 coupled to receive a write speed clock signal from the control processor 32. The write speed clock is a clock representative of the speed with which the transport mechanism 36 receives and passes the document 10 beneath the write head 38 or the write head 38 passes across the document 10. The frequency synthesizer 50 operates on the write speed clock and generates a synchronizing clock (SR clock) signal 204 which is coupled to a divide-by-8 circuit 52 and to a parallel-to serial converter 54. The divide-by-8 circuit 52 generates identical load and increment signals 206 and 207, respectively. The increment signal 207 is coupled to a counter 56 and the load signal 206 is coupled the parallel-to-serial converter 54. The control processor 32, upon receiving appropriate signals from the transport mechanism 36 indicating proper alignment of the document and correct write speed in the transport mechanism 36, generates a "write enable" signal 240 and a "write window" signal 242 (FIG. 6C). The write enable signal 240 enables writing when the transport mechanism 36 indicates that the head 38 is over the magnetic stripe 18. As soon as a high write enable signal 240 occurs, the counter 56 is enabled and a switch 58 closed. The leading edge data 150 (FIG. 4), which may consist of leading framing characters or leading ones, is then written onto the magnetic stripe 18 by the head 38 which causes flux changes to occur and remain impressed along the length of the magnetic stripe 18.

The write window signal 242 indicates the beginning of the start sentinel 152 and the end of the leading edge 150 and enables the counter 56 to increment beyond "2". More specifically, counter 56 increments on the increment signal 207 (FIG. 6A) which occurs once every eighth SR clock pulse (204). Thus, the counter 56 increments for each eighth binary bit in the octal represented sequence 202 (222 in FIG. 6B) received from the control processor 32. The count of the counter 56 and memory address data 200 (see also FIG. 8) from the control processor 32 are coupled to a data memory 60 so as to store data in the proper storage location. the memory 60 is also coupled to the control processor 32 to receive data such as that illustrated by the octal sequence 202 (FIG. 6A) or 222 (FIG. 6B).

The data stored in the data memory 60 is provided to the parallel-to-serial converter 54 in groups of eight binary bits whenever a load pulse 206 occurs. The parallel-to-serial converter 54 then outputs the value of one binary bit string (8 binary bits) each time there is an SR clock pulse 204, with a flux changing pulse generated whenever there is a "1" in the binary bit being serially outputted. The resultant serial data signal 208 from the parallel-to-serial converter 54 is coupled to a toggle flipflop 62 to generate the write waveform 210 (224 in FIG. 6B). The output from the toggle flipflop 62 is next coupled in sequence to a level shifter 64, the switch 58, a slope limiter 66 and a voltage-to-current converter and driver 68 to generate the write current 212 provided to the head 38. The level shifter 64 makes the waveform of the write current 212 symmetrical about ground potential with the slope limiter 66 controlling the rise and fall times.

Figure 7:
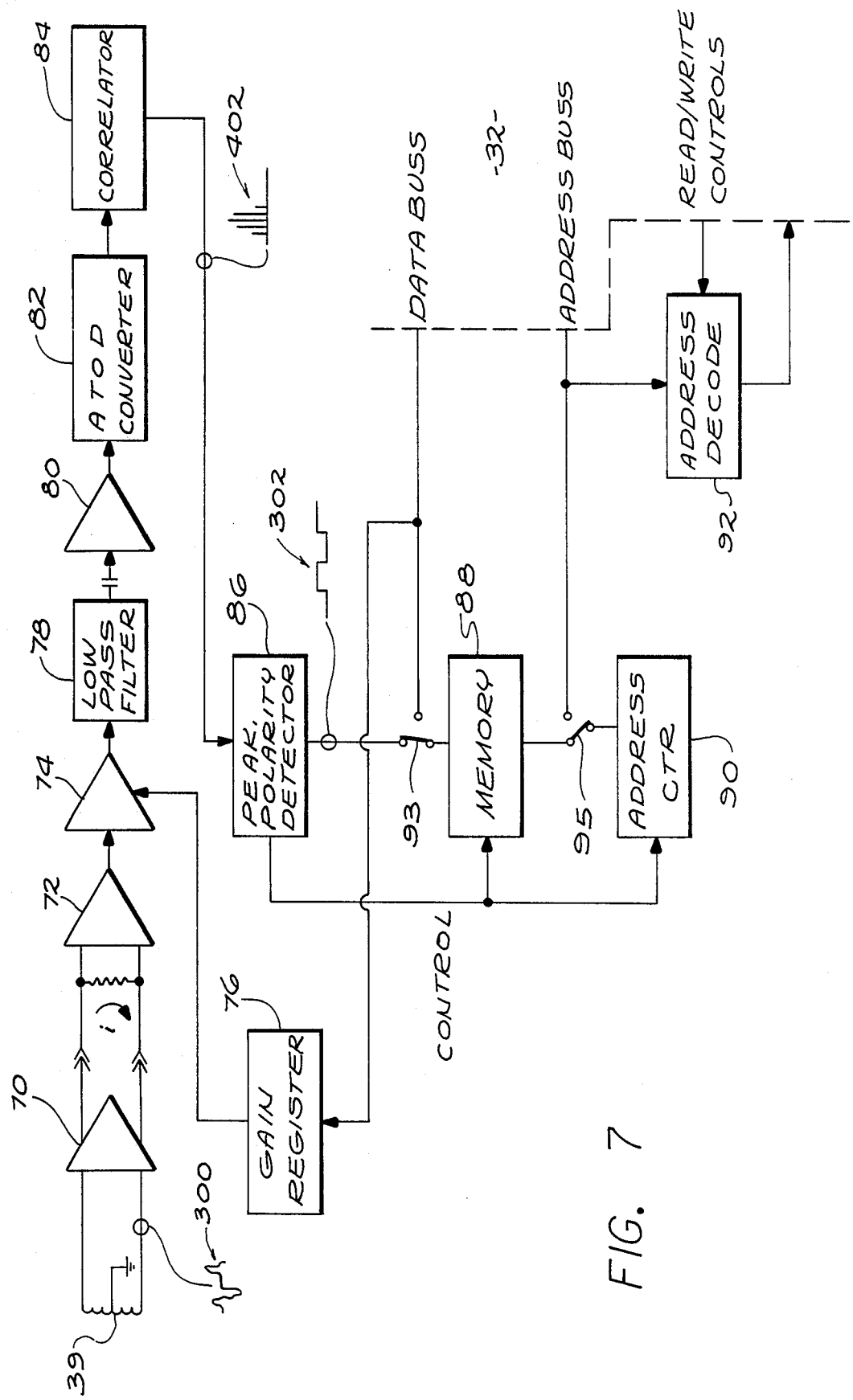
FIG. 7 is a simplified block diagram of a read subsystem useful in reading flux changes from a magnetic stripe.

Referring to FIG. 7, in conjunction with FIGS. 3 and 8, the document 10 may be verified by inserting the document 10 into the transport mechanism 36 which causes the document 10 and the read head 39 to move relative to one another at a predefined rate under control of the control processor 32. As the document 10 passes the magnetic read head 39, flux changes previously impressed along the length of the magnetic stripe 18 are sensed causing an analog signal to be generated which ideally would look like signal 228 but in reality will look like an actual read signal 300. The signal 300 is coupled to an AGC amplifier 70. The output of the AGC amplifier 70 is coupled to a receiver preamplifier 72 and, optionally, a digital controlled gain amplifier 74. Referring momentarily to FIG. 8 the "actual read" curve 300 illustrates a peak which occurs below a minimum peak detection threshold 301 and specifically identified as a "dropout". In certain instances, a significant increase in the retrieval of data will occur by either decreasing the threshold 301 or increasing the gain of the amplifier 74 so that the "dropout" peak in the actual read signal 300 will be detected as a peak and hence will not be lost. The control processor 32 supplies a gain register 76 with data through the data buss to control the gain of the digitally controlled gain amplifier 74.

The output of the amplifier 74 is next coupled to a low pass filter 78 which filters out high frequency noise, such as signal spikes, which would otherwise register as a flux change and hence indicate a false peak. The low pass filter therefore provides a means of additionally increasing the reliability of reading the flux changes stored on the magnetic stripe.

Figure 9:
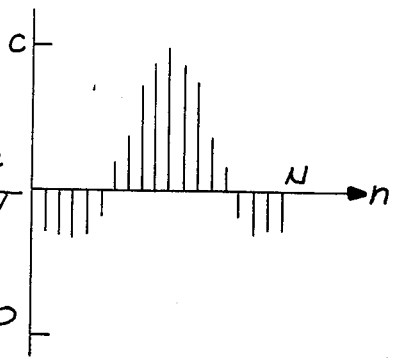
FIG. 9 is a series of waveforms illustrating the operation of the correlator and peak and polarity detector blocks of FIG. 7.
Figure 9:
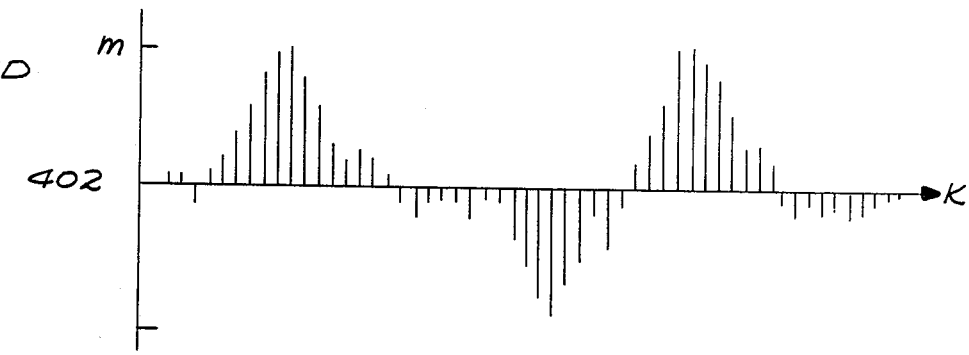
Figure 9:
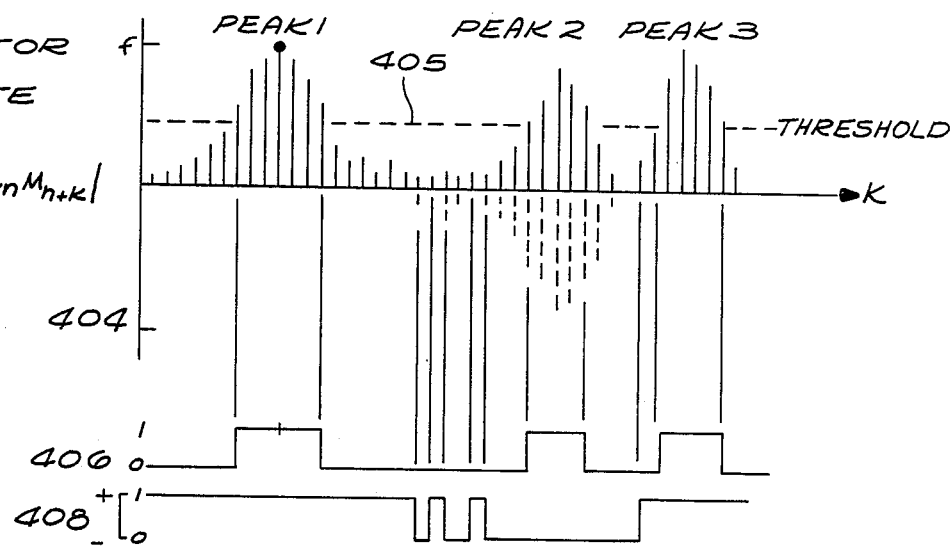
Figure 9:
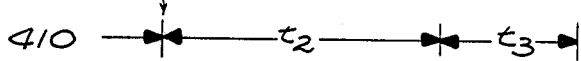

The output of the low pass filter 78 is coupled through a suitable conventional AC couple buffer amplifier 80 to an A to D converter 82 whereby the analog signal 300 (FIG. 8) is sampled at predefined intervals to generate a digitized data signal 402 (FIG. 9). The output of the A to D converter 82 is coupled to a correlator 84 with the objective being to identify the peaks in the signal 300 and thereby determine, as accurately as possible, the location of each flux change and the time between each peak, and whether that peak has a negative or a positive polarity.

The digitized signal 402 from the A to D converter 82 is therefore coupled to the correlator 84. Referring to FIG. 9, the correlator 84 applies an nth order correlator function 400 which in the present invention is selected to be approximately a cosine squared function offset so that $$\sum_{n=1}^{N} c_n = A$$

where A is 0 for no DC response but may be set to some small value so as to include some DC sensitivity.

In accordance with conventional correlator theory, the absolute value of the correlator output maybe defined as $$F_k = \left| \sum_{k=1}^{k} \sum_{n=1}^{n} c_n m_{n+k} \right|$$

and is illustrated at 404 in FIG. 9.

The output 404 ($F_k$) of the correlator 84 is coupled to a peak and polarity detector 86 which defines a square wave 406 having a value of one whenever the output of the correlator 84 is greater than a predefined threshold 405 and is zero if the output of the correlator 84 is below the threshold 405. Additionally, the peak, polarity detector 86 generates a sign signal 408 which identifies the correlator output 404 as being either positive or negative. Hence, if the output 404 of the correlator 84 was positive, then the sign signal 408 would be assigned a value of one. However, if the output of the correlator 84 was negative, then the sign signal 408 would be set to zero.

In accordance with the invention, the midpoint of each square wave of the signal 406 (410 in FIG. 9) is identified and coupled to generate a digital read signal 302 (FIG. 8) in which each transition represents a midpoint (and hence a peak) in the signal 406. The data used by the control processor 32 is the polarity of each peak (transition in the read signal 302) and the time duration since the last peak (transition). To derive time duration and polarity information from the read signal 302, a memory 88, an address counter 90, switches 93 and 95 and an address decoder 92 are coupled, under the control of the control processor 32, to receive the digital read signal 302 and generate the time duration and polarity data which is stored in the memory 88 in byte format (herein "information byte") where each information byte represents the data for one peak i.e., one bit in the bit string. Each information byte has eight information bits and includes information bits indicating the polarity and state (peak or non-peak) several information bits (e.g., 6) set to represent the time duration as a number of predefined time increments such as 2.5 µsec. The data in the memory 88 is periodically sent to the control processor 32 via the data buss where the data is processed to correct errors in the bit string.

In accordance with the present invention, once the time between peaks (transitions) and the polarity signal information is provided to the central processor 32, a recovery process is applied so that a bit string with relatively few or no errors will take less execution time than bit string containing a significant number of errors.

The data recovery method according to the invention first considers the time duration between a peak and the previous peak and the polarity of each peak (i.e., each byte of information) individually. Only one of five conditions can occur resulting in a decision as to the value of a data bit represented by an information byte. The information byte and modifications to the information byte are then used to construct a second data buffer consisting of bits of the string being reconstructed. The five conditions and the resultant bits to be stored in the second buffer are as follows:

1. If the time duration of the information byte (time from the previous peak) is within limits determined by the control processor for a zero (i.e., equals a "zero bit time" ± an acceptable deviation), and the polarity of the information byte is opposite from that of the previous information byte, the bit represented by the information byte must be a zero and therefore a zero is stored for that bit in the second buffer.
2. If the time duration of the information byte is within the limits determined by the control processor for a zero, and the polarity is the same as that of the following information byte, a flux transition (peak) has been missed. This necessarily means that the data represented by the information byte is a one and therefore a one is stored in the second buffer in the address for that bit.
3. If the sum of the time duration of the current information byte and the time duration of the next information byte is within the bit time for a zero, and the polarities of the two information bytes are opposite, the bit value is necessarily a one and therefore a one is stored in the second buffer. If the bit is a "one", the following information byte is part of that "one" and therefore needs no further analysis and is skipped.
4. If the time duration of two consecutive information bytes are within the time duration specified for a framing character, and the information bytes have opposite polarities, a "2" is stored in the second buffer and an offset (see FIG. 10) of each framing character in the buffer at that address is recorded for later use.
5. If the data value of an information byte is invalid (i.e., does not meet one of the above four conditions), for any reason, the actual value of the time duration information of the information byte is stored in the second buffer unless the actual value is less than 2 in which event a 3 is stored at the bit address of the second buffer.

During the above process, the control processor computes the mean bit time, that is, the time between peaks for a valid bit (whether 1 or 0) using an average of the 16 previous valid bit time frames. This mean bit time value is used as the basis for determining which condition 1-5 above is met by an information byte so as to identify data bits in the bit string as 0's, 1's, framing characters or errors.

The mean bit time value represents the speed that the magnetic stripe passes across the magnetic head. This speed, in the preferred embodiment, is not allowed to vary more than ±10% from a nominal speed. Further, the determination of when a peak occurs in respect to the established mean bit time value in determining whether the data character is valid, is set at ±12% for the writing and ±25% for reading. Furthermore, when an invalid data value is detected, the actual bit time of each following information byte is stored in the second buffer until a "0" followed by two consecutive valid values (i.e., meet conditions 1, 2, or 3) or a framing character (condition 4) is detected.

Once the second data buffer has been constructed, the number of data bits in each data frame (8 bytes or 64 bits of data in the bit string) is determined. Since the number of data bits between framing characters is predefined and known, the contiguous, invalid data values (time duration values) are summed and divided by the bit time defined for a zero. The result is the number of missing bits. This information enables the error correcting codes to determine the value of data bits not otherwise corrected.

In accordance with a specific embodiment of the invention, the start sentinel is detected by shifting the data from the second buffer and comparing it with a predefined bit pattern for the start sentinel. If no more than a predefined number of bit errors occur, for example 2 bit errors, a match is deemed to have occurred. The location along the second buffer at which the last bit of the start sentinel occurred is then recorded for later use. The stop sentinel is similarly located with reference to a predefined bit pattern. The location of the first bit of the stop sentinel in the second buffer is similarly stored. Finally, the number of data bits between the stop and start sentinels is identified. Since the total number of data bits which should occur is known, this additional information can be utilized to further identify the number, location, and, in some instances, even derive the value of missing or erroneous data in the second buffer.

Figure 10:
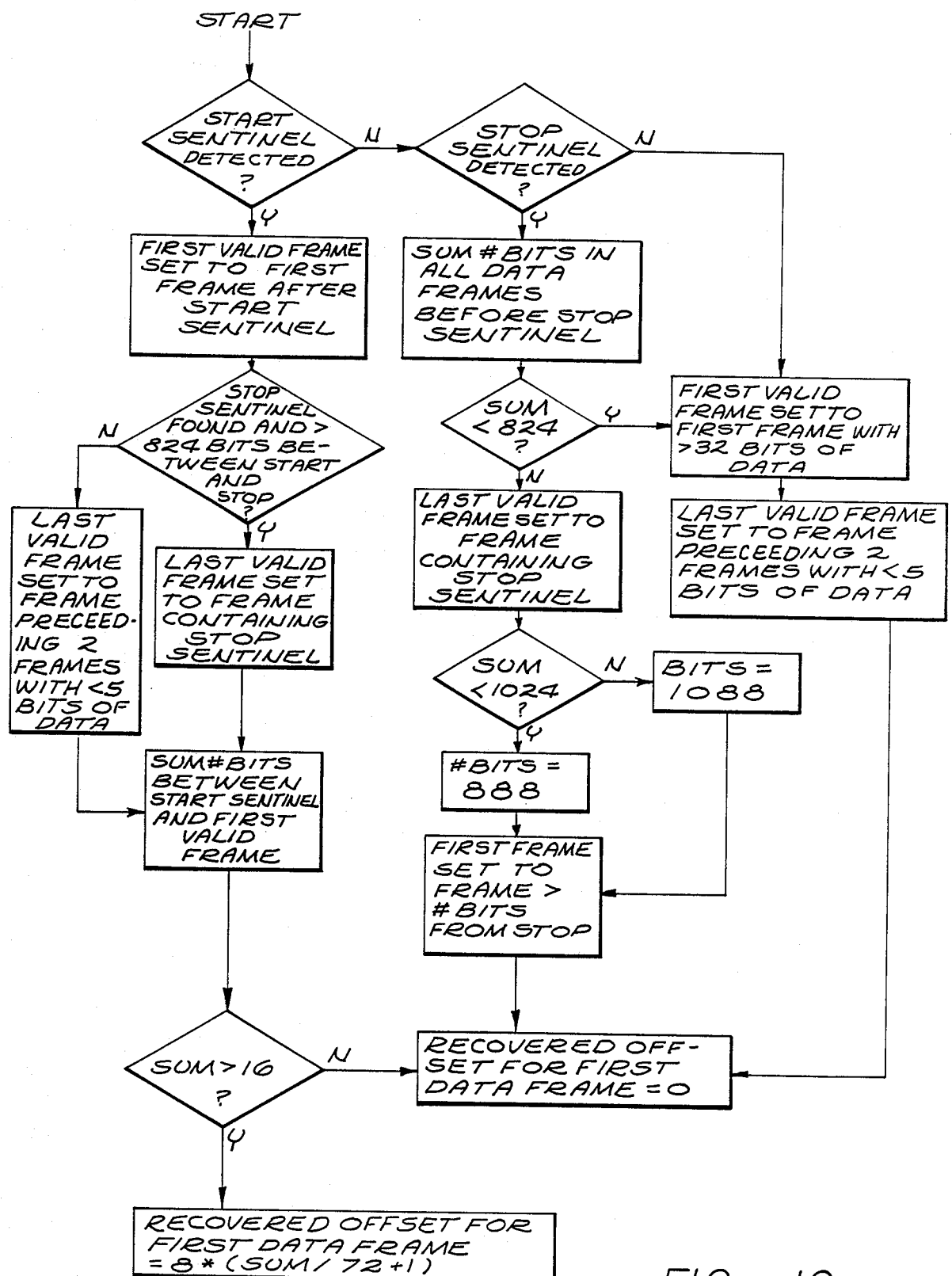
FIG. 10 is a partial flow chart illustrating a means of recovering the number of data bits in a bit string and computation of data frame offsets.

The start and end of the data to be recovered can be determined by the location of the last bit of the start sentinel, the first framing character and the number of bits between the start and stop sentinels. A flow chart illustrative of one technique for obtaining this information is illustrated in FIG. 10.

In accordance with the preferred embodiment of the invention, there are 8 bytes of data (64 bits) between each framing character (herein referred to as a "frame of data"). Accordingly, the byte offset (referred to in condition number 4 above) of each frame of data in the recovered array in the second buffer is determined by the number of bits in each frame of data between the first and last valid frame. The offset of the first frame is determined in accordance with the flow chart of FIG. 10. In accordance with the invention, the offsets for the remaining frames, once the offset for the first frame is determined, is in accordance with the equation:

Offset $(n+1)$=Offset $(n)$+8 * (bits $(n)$/72+1)

where;
offset (n) is the byte offset in the recovered data arry for frame n, and
bits (n) is the number of detected bits in frame n.

A frame length of 72 bits is used to compensate for inaccuracies in calculating the number of bits in each frame.

In accordance with further aspects of the invention, starting with the first valid frame, the data bits are packed into bytes in the recovered data bit string in the second buffer. A maximum of 64 bits of data are packed per frame of data until the last frame of data is formed. Buffer locations and recovered offsets of invalid data are recorded and all missing bits are packed as 1's. If any frame had an offset greater than 8 bytes from the previous frame, the data bits from the previous frame are packed into bytes starting from the end of the frame and moving in reverse. A maximum of 64 bits are packed for a missing frame. Information concerning invalid data is recorded, as previously described, with 1's.

Figure 11:
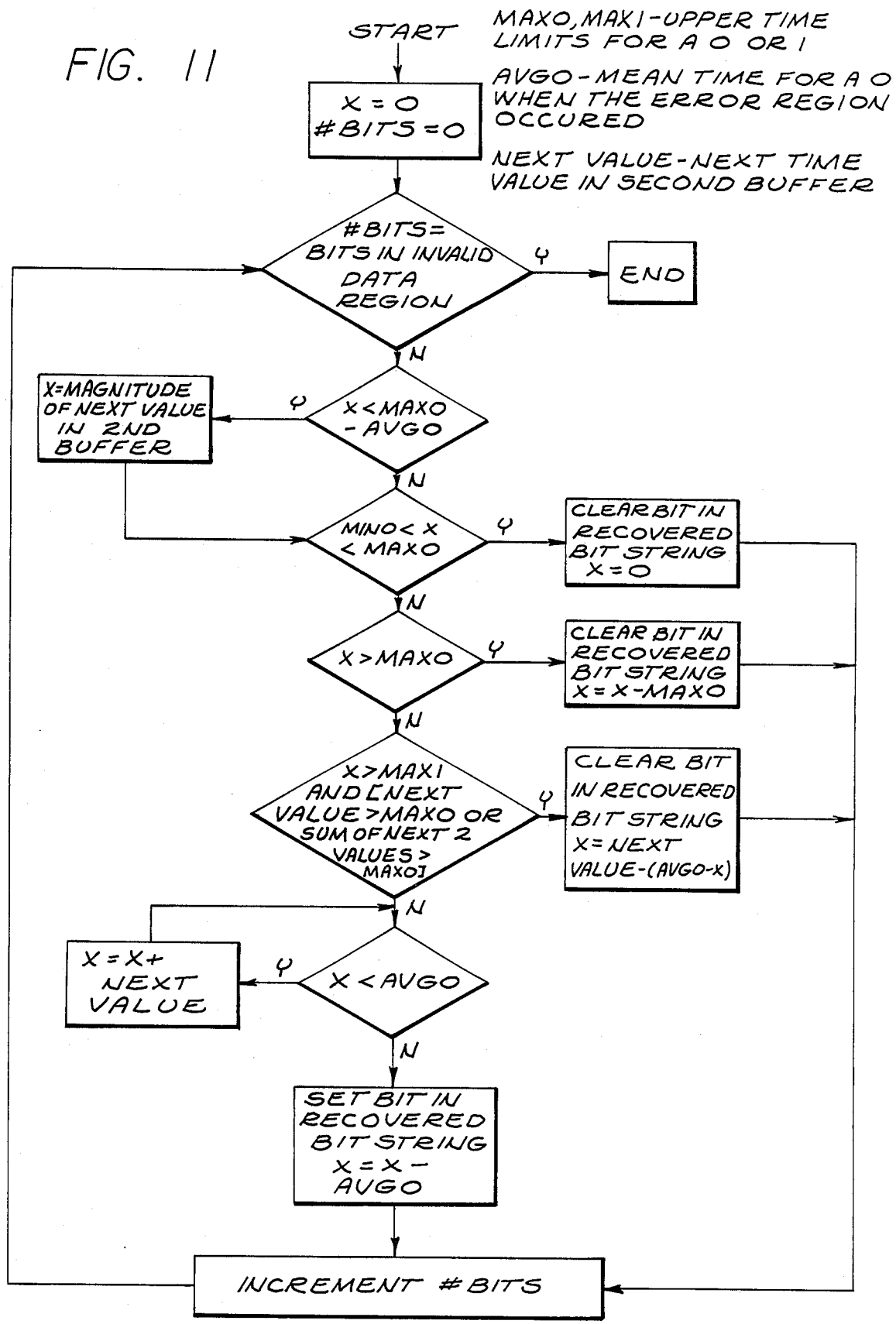
FIG. 11 is a flow chart illustrating one means of identifying the number and location of bits in a section of the bit string identified as containing erroneous bit values.

In accordance with an illustrative embodiment of the invention, if the number of recovered data bits is greater than 888 but less than 1024, and less than 3 invalid areas in the data bit string were detected, error correction routines are executed with the message (bit string) length set to 119 bytes. If the number of recovered data bits is greater than 1024 and less than 3 invalid areas were detected, the error correction routines are executed with the message (bit string) length set to 144 bytes. If the error correction routines are unsuccessful, or the above conditions are not met, values stored in the invalid data areas are evaluated to determine the content. Since three valid data values are required to end an "invalid data area," the last two values in the invalid data area are valid. Therefore, the process begins at the end of the invalid data area (error area) and moves toward the start examining the data values individually. The flow chart fo an illustrative means for performing this process is set forth in FIG. 11.

Error correction routines using the error correction code are next executed with the message length set to 119 bytes if less than 1024 bit are recovered. Otherwise the message length is set to 144 bytes. If the error correction routines are unsuccessful, the bits in each invalid data area, except for the last two bits in each invalid data area, are inverted. The error correction routines are executed again with the message length unchanged. If the error correction routines are still unsuccessful, the message length is changed to the other set length, (that is 119 to 144 or 144 to 119), and the error correction routines are again executed. If the error correction routines are still unsuccessful, the data bits in each invalid data area are inverted to their original values and the error correction routines are executed with the message length unchanged. If the error correction routines are still unsuccessful, an error code is generated indicating that the document is not readable.

As previously indicated, various error correction codes are possible in accordance with the invention. However, in the preferred embodiment, error correction using the Bose-Chaudhuri-Hocquenghem codes as set forth in the Peterson and Weldon book entitled *Error-Correcting Codes Second Edition*, published by the MIT Press and fully described at page 269 et seq, is preferred.

Once the originally stored encrypted identifier (verification value) has been recovered without error, it is decrypted and compared against a second identifier derived from the document's uniqueness characteristic. A positive correlation between them means the document is authentic.

Although the above description has been made with reference to the illustrative system of FIG. 3 which includes both magnetic stripe reading and writing capabilities, passive reading systems without the write subsystem 34 or write head 38 are contemplated at most remote verification locations since writing capabilities would be unnecessary. Various other changes and modifications are also possible, including using a different storage medium, such as a bar code or other printed code pattern, without departing from the present invention.

What is claimed is:
1. A method for authenticating a printable item made of a medium subject to physical damage and having an irregular random surface and a machine-readable uniqueness characteristic over a specified are of the item, the method comprising the steps of:
applying a magnetic composition onto a part of the irregular surface of the item, the magnetic composition forming a magnetic stripe having a non-uniform magnetic characteristic along the surface of the item;
encoding the item according to the substeps of:
reading the uniqueness characteristic along the specified area of the item to define an identifier;

writing the identifier value onto the magnetic stripe to thereby encode the item; and authenticating the encoded item according to the substeps of:

reading the uniqueness characteristic along the specified area of the item to obtain a verification value;

reading the magnetic stripe to obtain the identifier written thereon by substeps of:

sensing the magnetic flux variations along the magnetic stripe and generating therefrom an analog data signal characterized by peaks in the analog data signal;

conditioning the analog data signal by obtaining a uniform amplitude of the peaks and filtering of noise from the signal;

detecting the position of the peaks, whether of negative or positive polarity, of the conditioned analog data signal;

sensing the differential position between successive peaks;

sensing the polarity of each peak;

processing the differential positions and polarity information to assign a first value representative of a "0" to a bit when there is a first differential position value, to assign a second value representative of a "1" when there is a second differential position value, to assign a third value representative of a non-data character when there is a third differential position value, and assigning values other than the first, second or third values to peaks whose differential position is other than the first, second or third differential positions;

recovering the values of the data bits whose value could not be defined in the step of processing by applying predefined error correction criteria to a data bit string of the assigned values; and comparing the verification value and the identifier read from the magnetic stripe according to a predefined comparison criterion, the item being authenticated when the verification value and the read identifier compare according to the predefined comparison criterion.

2. The method of claim 1 wherein the step of encoding comprises a further substep of encrypting the identifier according to a predefined encryption key.

3. The method of claim 2 wherein the step of authentication comprises a further substep decrypting the encrypted identification value stored on the magnetic stripe according to a decryption key prior to comparing the decrypted identifier with the verification value to authenticate the item.

4. A method for authenticating a printable item made of a medium subject to physical damage and having an irregular random surface and a machine-readable uniqueness characteristic over a specified area of time, the method comprising the steps of:

applying a magnetic composition onto a part of the irregular surface of the item, the magnetic composition forming a magnetic stripe having a non-uniform magnetic characteristic along the surface of the item;

encoding the item according to the substeps of: reading the uniqueness characteristic along the specified area of the item to define an identifier;

writing the identifier value onto the magnetic stripe to thereby encode the item by substeps of:

defining a first string of bits each bit having a value of "1" or "0" representative of a data bit string;

defining a second string of bits each bit having a value of "1" or "0" representative of a start sentinel;

defining a third string of bits, each bit having a value of "1" or "0" representative of a stop sentinel;

representing each bit of the first, second and third string of bits by a predefined time period between flux changes along the magnetic stripe, a "0" being represented by a first time period and a "1" being represented by two consecutive second time periods, each second time period equal to ½ the duration of the first time period;

defining a framing character having two consecutive third time periods, each equal to 3/2 the duration of the first time period;

effecting magnetic flux changes along the magnetic stripe in accordance with the time period representation for "1's", "0's" and framing characters to store first the second string, next the first string and last the third string, with framing characters being interposed at predefined intervals in the first string; and authenticating the encoded item according to the substeps of:

reading the uniqueness characteristic along the specified area of the item to obtain a verification value;

reading the magnetic stripe to obtain the identifier written thereon; and comparing the verification value and the identifier read from the magnetic stripe according to a predefined comparison criterion, the item being authenticated when the verification value and the read identifier compare according to the predefined comparison criterion.

5. The method of claim 4, wherein the step of encoding comprises the further substep of encrypting the identifer according to a predefined encryption key.

6. The method of claim 5 wherein the step of authentication comprises a further substep of decrypting the encrypted identification value stored on the magnetic stripe according to a decryption key prior to comparing the decrypted identifier with the verification value to authenticate the item.

7. A method for authenticating a document or the like having a machine-readable uniqueness characteristic, comprising the steps of:

applying a magnetic composition onto a part of said document;

sensing said uniqueness characteristic from said document to define an identifier;

encoding said identifier onto said magnetic composition according to a predefined format to define a string of bits; and authenticating said document according to the substeps of:

reading said magnetic composition to retrieve said identifier encoded thereon;

processing said encoded identifier by identifying the differential positions and polarity information of signal peaks from said coded identifier and assigning a first value representative of a "0" to a bit when there is a first differential position value, assigning a second value representative of a "1" when there is a second differential position value, assigning a third value representative of a nondata character when there is a third differential position value, and assigning values other than the first, second or third values to peaks whose differential position is other than the first, second or third differential positions;

applying error correction techniques to correct errors in said identifier;

freshly sensing said uniqueness characteristic to define a verification identifier; and comparing said corrected identifier with said verification identifier according to a predefined comparison criterion to authenticate said document.

8. The method according to claim 7 wherein said step of encoding further includes encrypting said identifier.

9. The method according to claim 8 wherein said step of comparing further includes decrypting said identifier.

10. The method according to claim 7 wherein said substep of reading comprises steps of:

identifying the location of flux changes along said magnetic composition corresponding to the identifier encoded thereon;

identifying the polarity of said flux changes;

determining the space between said flux changes; and determining the value of the bits of said encoded identifier by comparing said space and polarity data against a set of predefined conditions.

11. The method according to claim 7 wherein said step of applying a magnetic composition comprises printing said magnetic composition on said document.

12. The method according to claim 7 wherein said applied magnetic composition exhibits a nonuniform magnetic characteristic.

13. The method according to claim 7 wherein said step of encoding comprises encoding said identifier on said magnetic composition by defining a bit string wherein each bit is representative of a data bit string, or a start sentinel, or a stop sentinel and each bit of said bit string is represented by a predefined time period bteween magnetic flux changes.

14. A method for authenticating a document or the like having a machine-readable uniqueness characteristic comprising the steps of:

applying a magnetic composition onto a part of said document;

sensing said uniqueness characteristic from said document to define an identifier;

encoding said identifier onto said magnetic composition according to a predefined format to define a string of bits; and authenticating said document according to the substeps of:

sensing the magnetic flux variations from said magnetic composition corresponding to said identifier encoded thereon to generate an analog data signal;

conditioning said signal by obtaining a uniform amplitude of peaks in said signal and filtering noise from said signal;

detecting the position of said peaks, regardless of polarity, of said conditioned signal;

sensing the differential position between successive peaks;

processing the differential positions and polarity information to assign a first value representative of a "0" to a bit when there is a first differential position value, assigning a second value representative of a "1" when there is a second differential position value, assigning a third value representative of a nondata character when there is a third differential position value, and assigning values other than the first, second or third values to peaks whose differential position is other than the first, second or third differential positions;

recovering data values for data whose value could not be defined in said processing step by applying error correction criteria to said data with assigned values to correct said identifier;

freshly sensing said uniqueness characteristic from said document to define a verification identifier; and comparing said verification identifier characteristic and said corrected identifier according to a comparison criterion to authenticate said document.

15. The method according to claim 14 wherein said step of encoding further includes encrypting said identifier.

16. The method according to claim 15 wherein said step of comparing further includes decrypting said identifier.

17. The method according to claim 14 wherein said step of applying a magnetic composition comprises printing said magnetic composition on said document.

18. The method according to claim 14 wherein said applied magnetic composition exhibits a nonuniform magnetic characteristic.

19. The method according to claim 14 wherein said step of encoding comprises encoding said identifier on said magnetic composition by defining a bit string wherein each bit is representative of a data bit string, or a start sentinel, or a stop sentinel and each bit of said bit string is represented by a predefined time period between magnetic flux changes.

* * * * *